(12) United States Patent
Crawford

(10) Patent No.: US 6,456,242 B1
(45) Date of Patent: Sep. 24, 2002

(54) CONFORMAL BOX ANTENNA

(75) Inventor: James A. Crawford, San Diego, CA (US)

(73) Assignee: Magis Networks, Inc., San Diego, CA (US)

( * ) Notice: Subject to any disclaimer, the term of this patent is extended or adjusted under 35 U.S.C. 154(b) by 0 days.

(21) Appl. No.: 09/799,411

(22) Filed: Mar. 5, 2001

(51) Int. Cl.$^7$ ................................................ H01Q 3/02
(52) U.S. Cl. ........................... 343/700 MS; 343/702
(58) Field of Search .................... 343/700 MS, 702, 343/725, 893, 749, 826, 846, 828

(56) References Cited

U.S. PATENT DOCUMENTS

| | | | |
|---|---|---|---|
| 3,488,445 A | 1/1970 | Chang | 179/15 |
| 4,538,153 A | 8/1985 | Taga | 343/700 |
| 5,138,328 A | 8/1992 | Zibrik et al. | 343/702 |
| 5,146,232 A | 9/1992 | Nishikawa et al. | 343/713 |
| 5,282,222 A | 1/1994 | Fattouche et al. | 375/1 |
| 5,369,670 A | 11/1994 | Zagloul et al. | 375/84 |
| 5,402,136 A | 3/1995 | Goto et al. | 343/729 |
| 5,410,748 A | 4/1995 | Hayashi et al. | 455/277.1 |
| 5,420,599 A | 5/1995 | Erkocevic | 343/828 |
| 5,463,406 A | 10/1995 | Vannatta | 343/725 |
| 5,486,836 A | 1/1996 | Kuffner et al. | 343/700 |
| 5,487,069 A | 1/1996 | O'Sullivan et al. | 370/94.3 |
| 5,552,798 A | 9/1996 | Dietrich et al. | 343/893 |
| 5,555,268 A | 9/1996 | Fattouche et al. | 375/206 |
| 5,650,788 A | 7/1997 | Jha | 343/700 |
| 5,657,028 A | 8/1997 | Sanad | 343/700 |
| 5,680,144 A | 10/1997 | Sanad | 343/700 |
| 5,832,031 A | 11/1998 | Hammons, Jr. | 375/262 |
| 5,832,044 A | 11/1998 | Sousa et al. | 375/347 |
| 5,867,131 A | 2/1999 | Camp, Jr. et al. | 343/797 |
| 5,936,580 A | 8/1999 | Van Puijenbroek | 343/700 |
| 5,943,020 A | 8/1999 | Liebendoerfer et al. | 343/702 |
| 5,990,838 A | 11/1999 | Burns et al. | 343/702 |
| 5,991,864 A | 11/1999 | Kinney et al. | 712/1 |
| 5,995,062 A | 11/1999 | Denney et al. | 343/853 |
| 6,008,774 A | 12/1999 | Wu | 343/828 |
| 6,031,503 A | 2/2000 | Preiss et al. | 343/770 |
| 6,043,790 A | 3/2000 | Derneryd et al. | 343/853 |
| 6,054,955 A | * 4/2000 | Schlegel, Jr. et al. | 343/702 |
| 6,091,364 A | 7/2000 | Murakami et al. | 343/700 |
| 6,104,349 A | 8/2000 | Cohen | 343/702 |
| 6,115,762 A | 9/2000 | Bell et al. | 710/62 |
| 6,160,514 A | 12/2000 | Judd | 343/700 |
| 6,181,284 B1 | 1/2001 | Madsen et al. | 343/702 |
| 6,198,460 B1 | 3/2001 | Brankovic | 343/879 |
| 6,222,503 B1 | * 4/2001 | Gietema et al. | 343/890 |

OTHER PUBLICATIONS

U.S. patent application Ser. No. 09/693,465, Crawford, filed Oct. 19, 2000.
U.S. patent application Ser. No. 09/735,977, Crawford, filed Dec. 13, 2000.

* cited by examiner

Primary Examiner—Don Wong
Assistant Examiner—James Clinger
(74) Attorney, Agent, or Firm—Fitch, Even, Tabin & Flannery

(57) ABSTRACT

An antenna assembly that can conform to two or more noncoplanar walls of a housing associated with numerous different devices that communicate in a WLAN. At least two antenna elements are included with a first antenna element attached to a portion of a first wall and a second antenna element attached to a portion of a second wall. Active circuitry is attached to the backside of the antenna assembly and coupled to the antenna elements. The antenna assembly can be included on a base that can be easily added-on to a product. Spatial and/or polarization diversity can be achieved in a small form-factor at high frequencies, including the 5 to 6 GHz frequency band.

29 Claims, 6 Drawing Sheets

CONFORMAL BOX ANTENNA

BACKGROUND OF THE INVENTION

1. Field of the Invention

The present invention relates generally to antennas, and more specifically to small antenna structures possessing diversity characteristics.

2. Discussion of the Related Art

A multipath environment is created when radio frequency (RF) signals propagate over more than one path from the transmitter to the receiver. Alternate paths with different propagation times are created when the RF signal reflects from objects that are displaced from the direct path. The direct and alternate path signals sum at the receiver antenna to cause constructive and destructive interference, which have peaks and nulls. When the receiver antenna is positioned in a null, received signal strength drops and the communication channel is degraded or lost. The reflected signals may experience a change in polarization relative to the direct path signal. This multipath environment is typical of indoor and in-office wireless local area networks (WLAN).

An approach to addressing the multipath problem is to employ multiple receiver antenna elements in order to selectively receive a signal from more than one direction or from a slightly different position. This approach, known as "diversity", is achieved when receiving signals at different points in space or receiving signals with different polarization. Performance is further enhanced by isolating the separate antennas. Wireless communication link bit error rate (BER) performance is improved in a multipath environment if receive and/or transmit diversity is used.

Conventional antenna structures that employ diversity techniques tend to be expensive and physically large structures that utilize bulky connectors, such as coaxial cable connectors. Such antenna structures are not suitable for residential and office use where low-cost and small physical size are highly desirable characteristics. Furthermore, such antenna structures cannot be easily mounted or attached to the numerous different types of devices that may need to communicate in a WLAN. Thus, there is a need for antenna structures capable of employing diversity techniques that overcomes these and other disadvantages.

SUMMARY OF THE INVENTION

The present invention advantageously addresses the needs above as well as other needs by providing an antenna assembly that includes a portion of a first wall of a housing and a portion of a second wall of the housing. The first and second walls are noncoplanar. At least two antenna elements are included with a first of the at least two antenna elements being attached to the portion of the first wall and a second of the at least two antenna elements being attached to the portion of the second wall. Active circuitry is attached to a backside of at least one of the portion of the first wall and the portion of the second wall. The active circuitry is coupled to the at least two antenna elements.

In another embodiment, the invention can be characterized as an antenna assembly that includes a base having first and second plates that are noncoplanar and that are joined together. At least two antenna elements are included with a first of the at least two antenna elements being attached to the first plate and a second of the at least two antenna elements being attached to the second plate. Active circuitry is attached to a backside of at least one of the first and second plates. The active circuitry is coupled to the at least two antenna elements.

In a further embodiment, the invention can be characterized as a method that includes a method of making an antenna assembly. The method of making an antenna assembly includes the steps of: forming a base having first and second plates that are noncoplanar and that comprises a shape that conforms to a portion of a housing; attaching at least two antenna elements to the base with a first of the at least two antenna elements being located on a front side of the first plate and a second of the at least two antenna elements being located on a front side of the second plate; attaching active circuitry to a back side of at least one of the first and second plates; and coupling the active circuitry to the at least two antenna elements.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is not to be taken in a limiting sense, but is made merely for the purpose of describing the general principles of the invention. The scope of the invention should be determined with reference to the claims.

Figure 1:
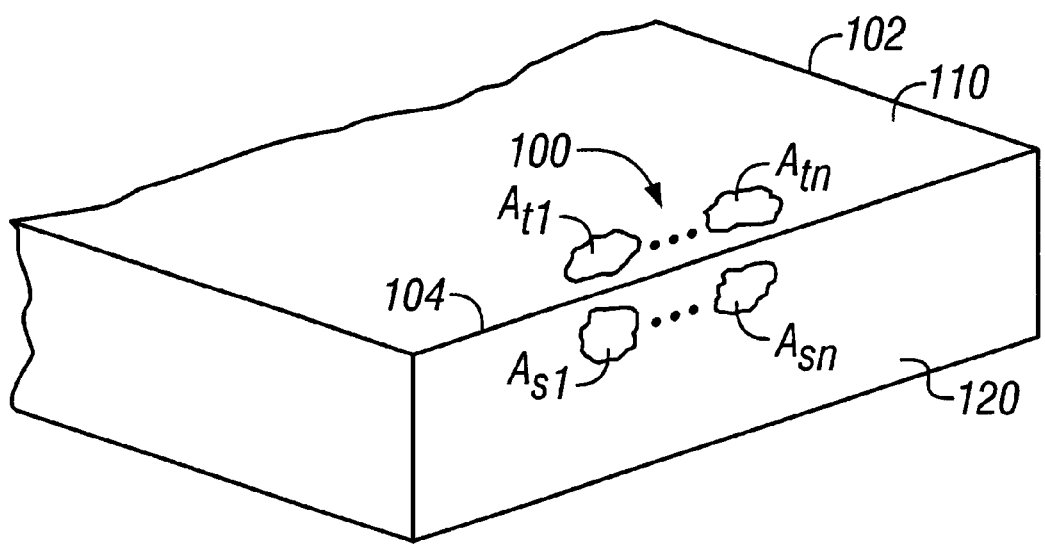
FIG. 1 is a perspective view illustrating a device housing having an antenna assembly incorporated therein in accordance with another embodiment of the present invention.

Referring to FIG. 1, there is illustrated an antenna assembly 100 made in accordance with an embodiment of the present invention. The antenna assembly 100 can be easily mounted or attached to numerous different types of devices that may need to communicate in a WLAN. Specifically, the antenna assembly 100 may be conveniently integrated into, or positioned on, portions of two or more walls or surfaces of a box or housing 102. In this way, the antenna assembly 100 conforms to the shape of a portion of the housing 102, and therefore, the antenna assembly 100 may be referred to as a conformal antenna. As illustrated, the antenna assembly 100 is particularly suited for placement on an edge 104 of the housing 102 where two non-coplanar walls or surfaces 110, 120 meet. It should be well understood that an edge of a housing may include a rounded, flat or otherwise irregular part of the housing where noncoplanar surfaces meet.

Although a generic box structure is illustrated, it should be well understood that the housing 102 may comprise a housing for nearly any type of device that may need to communicate wirelessly, such as for example, set-top boxes (including cable and XDSL), wireless local area network (WLAN) devices (including base stations, routers, repeaters, bridges), computers (including desktop, laptop, notebook, palmtop, and hand-held computers), information appliances, printers, fax machines, scanners, storage devices, televisions, stereos, thermostats, alarms (including burglar and fire alarms and associated sensors), household appliances (including washers, dryers, ovens, dishwashers, refrigerators), etc. The antenna assembly 100 can be used for performing wireless communications to and from any of these devices. Furthermore, the housing 102, as well as the other housings discussed herein, may comprise many different shapes and sizes. For example, the housings may have irregular surfaces with scattered flat regions where antenna elements could be situated.

The antenna assembly 100 is capable of achieving diversity and overcomes the disadvantages described above. It has good uniformity in signal strength in several directions, which makes it ideal for communicating with the numerous devices in a WLAN. It can be manufactured for very low cost and is extremely well suited to small form-factor applications that are to be used at high frequencies, including the 5 to 6 GHz frequency band. As will be discussed below, active circuitry, such as radio frequency (RF) circuitry, can be conveniently mounted on the backside of the antenna assembly 100. Such active circuitry may comprise separate or discrete components that are attached to the backside of the antenna assembly 100, or the active circuitry may be integrated with all of the components of the antenna assembly 100.

A total of two or more antenna elements are preferably distributed across two or more non-coplanar surfaces of the housing 102. In the illustrated example, one or more antenna elements $A_{t1}$ through $A_{tm}$ are located on a portion of the top wall 110 of the housing 102, and one or more antenna elements $A_{s1}$ through $A_{sn}$ are located on a portion of the side wall 120 of the housing 102. Thus, the total of two or more antenna elements may be comprised of one or more antenna elements located on the top wall 110 and one or more antenna elements located on the side wall 120. The antenna elements are preferably located on the outer surface (or front side) of the walls 110, 120.

The cloud-like shape of the antenna elements $A_{t1}$ through $A_{tm}$ and $A_{s1}$ through $A_{sn}$ is intended to indicate that many different types of antennas may be used for implementing the antenna elements $A_{t1}$ through $A_{tm}$ and $A_{s1}$ through $A_{sn}$. By way of example, patch antennas and/or monopole antennas may be used. Such monopole antennas may comprise vertical and/or horizontal monopole antennas. Furthermore, different types of antennas may even be used among the antenna elements $A_{t1}$ through $A_{tm}$ and $A_{s1}$ through $A_{sn}$.

As mentioned above, the antenna assembly 100 is capable of achieving diversity. Specifically, spatial diversity can be achieved by spacing individual antenna elements apart so as to obtain sufficient decorrelation. Sufficient spacing of the individual antenna elements is important for obtaining minimum uncorrelated fading of antenna outputs. Preferably, at least some of the antenna elements $A_{t1}$ through $A_{tm}$ and $A_{s1}$ through $A_{sn}$ are spaced apart by a distance greater than or equal to $0.5\lambda$ for a frequency of operation falling within the 5 to 6 GHz frequency band. Because $\lambda$ is so small for the 5 to 6 GHz frequency band, such spacing of antenna elements can be accomplished even when the housing 102 is relatively small, e.g., a housing for a hand held computer.

Polarization diversity can be achieved with the antenna assembly 100 when the polarizations of at least two of the antenna elements $A_{t1}$ through $A_{tm}$ and/or $A_{s1}$ through $A_{sn}$ are orthogonal to each other. Polarization diversity may be achieved in the present invention by using a combination of vertically and horizontally polarized antenna elements, or by positioning an active edge of one antenna element to be orthogonal to an active edge of another antenna element. For example, in a scenario where the two walls 110, 120 form a right angle (90°), the polarizations of the antenna elements $A_{t1}$ through $A_{tm}$ could be orthogonal to the polarizations of the antenna elements $A_{s1}$ through $A_{sn}$.

The antenna assembly 100, as well as other antenna assemblies described herein, are capable of achieving a high amount of diversity per unit volume by using simple antenna structures that can be hosted in a small form factor. Some embodiments of the present invention use a combination of spatial and polarization diversity to achieve a high number of reasonably uncorrelated antenna elements in the small form factor. It should be well understood, however, that some embodiments of the present invention may rely solely on spatial diversity and that some embodiments of the present invention may rely solely on polarization diversity.

When receiving a signal in a multi-path environment, the signal offered to the receiver contains not only a direct line-of-sight radio wave, but also a large number of reflected radio waves, which interfere with the direct wave to create a "composite signal." Two or more of the antenna elements $A_{t1}$ through $A_{tm}$ and $A_{s1}$ through $A_{sn}$ each receive this "composite signal." Each of these "composite signals" comprises a sum of the direct and alternate path signals, as well as signals that experience a change in polarization, which constructively and destructively interfere and create peaks and nulls. By relying on spatial diversity, polarization diversity, or a combination of both spatial and polarization diversity, the antenna assembly 100 can compensate for fading because several replicas of the same information carrying signal are received over multiple channels by different antenna elements. There is a good likelihood that at least one or more of these received signals will not be in a fade at any given instant in time, thus making it possible to deliver an adequate signal level to the receiver.

Because two or more of the antenna elements $A_{t1}$ through $A_{tm}$ and $A_{s1}$ through $A_{sn}$ are largely uncorrelated, more than one power amplifier stage in the transmitter can be used, thereby reducing the maximum power level required out of any individual power amplifier stage. This is highly advantageous for Orthogonal Frequency Division Multiplexing (OFDM) where the peak-to-average power ratio is a concern. Specifically, the FCC limits the total transmit power allowed, so this peak can be shared if there is more than one power amplifier stage involved.

Figure 2:
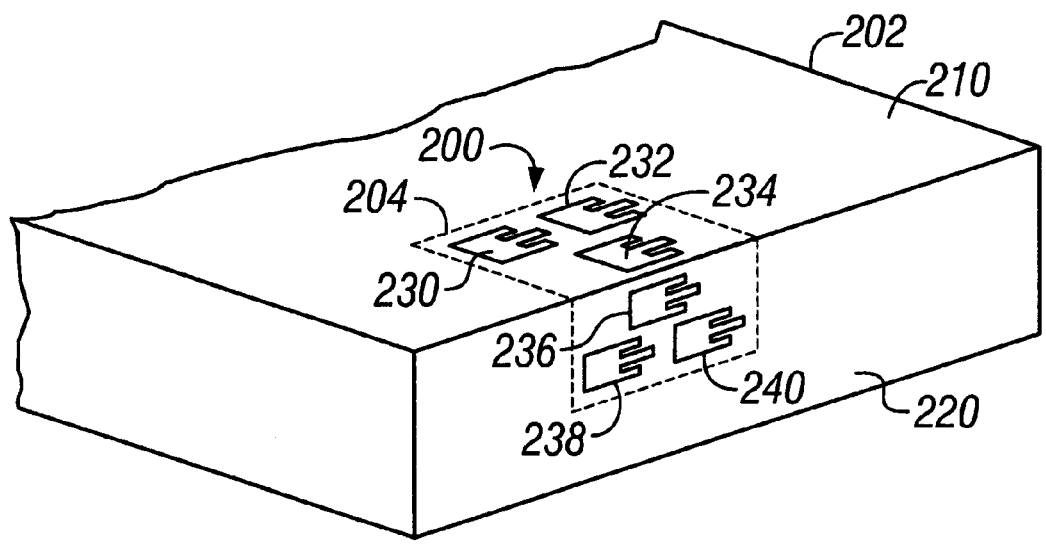
FIG. 2 is a perspective view illustrating a device housing having an antenna assembly incorporated therein in accordance with another embodiment of the present invention.

Referring to FIG. 2, there is illustrated an antenna assembly 200 made in accordance with another embodiment of the present invention. In this embodiment, a total of six antenna elements 230, 232, 234, 236, 238 and 240 are mounted on a housing 202. Three antenna elements 230, 232, 234 are mounted on a portion of a top wall 210 of the housing 202, and three antenna elements 236, 238, 240 are mounted on a portion of a side wall 220 of the housing 202. While this embodiment includes a total of six antenna elements, the present invention is not limited to the use of six antenna elements and is intended to include the use of two or more antenna elements. Furthermore, the antenna elements 230, 232, 234, 236, 238 and 240 may be distributed across the top and side walls 210, 220 in any manner just so long as at least one antenna element is located on the top wall 210 and at least one antenna element is located on the side wall 220. In other words, the present invention is not limited to the use of three antenna elements per wall. The antenna elements 230, 232, 234, 236, 238 and 240 are preferably located on the outer surface (or front side) of the walls 210, 220. As with the housing 102 discussed above (FIG. 1), the housing 202 may be part of many different types of devices.

Traditional patch antennas or printed microstrip antenna elements are a very cost-effective way to realize one or more of the individual antenna elements 230, 232, 234, 236, 238, 240. In this embodiment, all six of the antenna elements 230, 232, 234, 236, 238,240 are implemented with patch antennas. Many different types of patch antennas may be used, including ¼-wave, ½-wave and ¾-wave patch antennas. It should be well understood that other types of antennas may be used to realize one or more of the individual antenna elements 230, 232, 234, 236, 238, 240 in accordance with the present invention.

Printed copper (microstrip) techniques may be used to implement the patch antenna elements 230, 232, 234, 236, 238, 240. For example, the outer surface of the housing 202 may include metal patterns that define the structure of the patch antenna elements 230, 232, 234, 236, 238, 240, and the inner surface of the housing 202 can be metalized to provide a ground plane 204. By way of example, the ground plane 204 may comprise copper plating. The ground plane 204 is typically located on the inner surface of the housing 202 behind the antenna elements 230, 232, 234, 236, 238, 240. This kind of construction is extremely low-cost and low-profile.

The detailed design process for an individual patch antenna is well known. Each of the antenna elements 230, 232, 234, 236, 238, 240 is preferably individually designed to have good gain and Voltage Standing Wave Ratio (VSWR). This is standard procedure in antenna design. In addition, the individual antenna element designs are preferably optimized to preserve good gain and VSWR while also delivering good inter-element isolation. In other words, the antenna elements are preferably designed to exhibit acceptably low cross-correlation (i.e., isolation). Good isolation is important for achieving good diversity gain. Thus, each of the antenna elements 230, 232, 234, 236, 238, 240 preferably provides gain while also having good isolation between itself and other antenna elements.

The separate antenna elements 230, 232, 234, 236, 238, 240 are capable of offering spatial and/or polarization diversity, which delivers good receive and transmit diversity performance. As mentioned above, spatial diversity can be achieved by appropriately spacing two or more of the individual antenna elements 230, 232, 234, 236, 238, 240 so as to obtain sufficient decorrelation. Polarization diversity can be achieved by making the polarizations of at least two of the antenna elements 230, 232, 234, 236, 238, 240 orthogonal to each other. For example, in a scenario where the two walls 210, 220 form a right angle (90°), the polarizations of the antenna elements 230, 232, 234 would be orthogonal to the polarizations of the antenna elements 236, 238, 240. The antenna assembly 200 is very convenient for application in the 5 to 6 GHz frequency band where low-cost and antenna diversity is desired.

Figure 3:
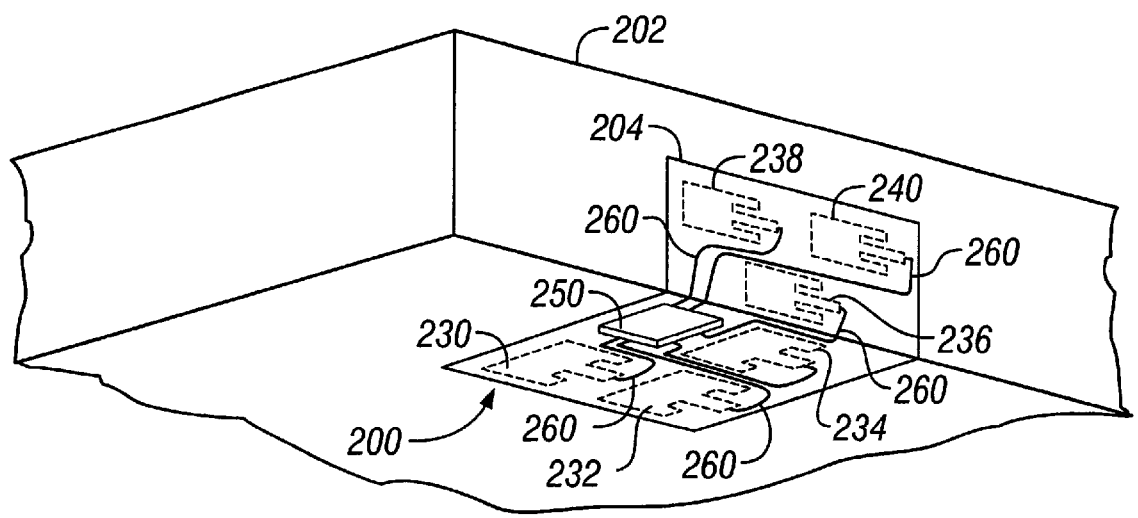
FIG. 3 is a perspective view illustrating the backside of the antenna assembly shown in FIG. 2.

Referring to FIG. 3, active circuitry 250 can be conveniently located within the housing 202 on the underside of the antenna assembly 200. By way of example, the active circuitry 250 may comprise power amplifiers for driving the antenna elements, low noise amplifiers (LNAs) for amplifying the received signals, RF switches for selecting signals routed to and from transmit and receive antenna elements, and/or digital baseband processing application specific integrated circuits (ASICs). The active circuitry 250 may also comprise additional circuitry that processes the transmitted and received signals, for example frequency translation from/to an intermediate frequency (IF) to/from the final radio frequency (RF) frequency. The active circuitry 250 may comprise some or all of the circuitry that is needed for the antenna elements 230, 232, 234, 236, 238, 240. In other words, additional circuitry that is needed for the antenna elements 230, 232, 234, 236, 238, 240 may be located elsewhere in the housing 202. The active circuitry 250 may be attached to the backside of either one or both of the walls 210, 220. Furthermore, the active circuitry 250 may comprise separate or discrete components, or the active circuitry 250 may be integrated with all of the components of the antenna assembly 200.

The active circuitry 250 may be mounted on the ground plane 204 using an appropriate means for isolating the active circuitry 250 from the ground plane 204.

Locating the active circuitry 250 on the backside of the antenna assembly 200 has the advantage of allowing the active circuitry 250 to interface directly with the antenna elements 230, 232, 234, 236, 238, 240, which simplifies signal routing and eliminates the need for coaxial antenna connections. Such location places the active circuitry 250 intimately close to the antenna elements 230, 232, 234, 236, 238, 240, which minimizes signal losses. Traces 260 may be used to directly interface the antenna elements 230, 232, 234, 236, 238, 240 with the active circuitry 250. Because the active circuitry 250 is intimately close to the antenna elements 230, 232, 234, 236, 238, 240, the traces 260 can be very short, which means that the antenna elements 230, 232, 234, 236, 238, 240 are connected almost immediately to the active circuitry 250. Short trace lengths are highly advantageous when operating at very high frequencies, such as 5 GHz, due to the losses that can occur with long traces. Preferably, trace lengths of less than or equal to 0.5 to 1.0 inches are used.

Figure 4A:
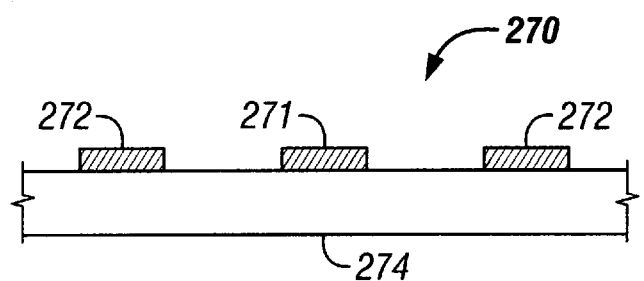
FIGS. 4A and 4B are cross sectional diagrams illustrating exemplary transmission line techniques that may be used with the antenna assembly shown in FIG. 3.

The traces 260 provide a cost-effective means of routing both the transmit and receive signals to and from each of the antenna elements 230, 232, 234, 236, 238, 240. The traces 260 may be implemented using many different techniques, including microstrip or other transmission line methods. For example, referring to FIG. 4A, the traces 260 may comprise a coplanar feed structure 270. A coplanar feed structure is very attractive because it is low-cost to implement. A coplanar feed structure does not use a ground plane. Instead, the signals are propagated along a center conductor 271 using a pair of ground conductors 272 with controlled geometry to maintain substantially constant transmission line impedance. The conductors 271, 272 may be formed on the wall 274 of the housing 202. The conductors 271, 272 may comprises copper or other metal, and the wall 274 may comprise plastic or other dielectric.

Figure 4B:
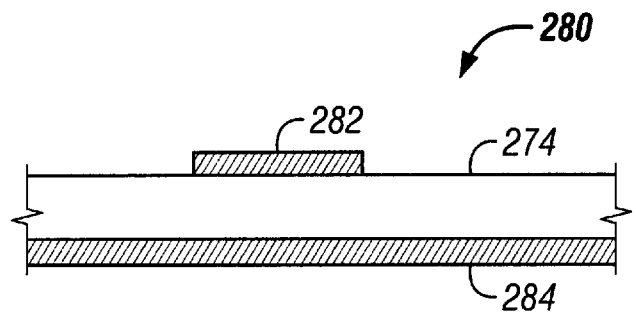

As another example, referring to FIG. 4B, the traces 260 may comprise a microstrip feed structure 280. A microstrip feed structure uses a single conductor 282 with a ground plane 284. The single conductor 282 is located on one side of the wall 274, and the ground plane 284 is located on the other side of the wall 274. The single conductor 282 and the ground plane 284 may comprise copper or other metal.

In other embodiments of the present invention, the antenna elements are distributed over more than two non-coplanar walls or surfaces. For example, referring to FIG. 5 there is illustrated an antenna assembly 300 made in accordance with another embodiment of the present invention. The antenna assembly 300 includes antenna elements that are distributed over three non-coplanar walls of a housing 302. Specifically, the antenna assembly 300 is capable of being located generally at the point of intersection of three non-coplanar walls 310, 320, 330, or in other words, at a corner of the housing 302. As with the housing 102 discussed above (FIG. 1), the housing 302 may be part of many different types of devices.

A total of three or more antenna elements are preferably distributed across the three non-coplanar walls 310, 320, 330 of the housing 302. In the illustrated example, one or more antenna elements $A_{b1}$ through $A_{bn}$ are located on a portion of the first wall 310, one or more antenna elements $A_{c1}$ through $A_{cn}$ are located on a portion of the second wall 320, and one or more antenna elements $A_{d1}$ through $A_{dn}$ are located on a portion of a third wall 320. Thus, the total of three or more antenna elements may be comprised of one or more antenna elements located on the first wall 310, one or more antenna elements located on the second wall 320, and one or more antenna elements located on the third wall 330. In other words, there is at least one antenna element located on each wall 310, 320, 330. The antenna elements are preferably located on the outer surface (or front side) of the walls 310, 320, 330. As above, the cloud-like shape of the antenna elements is intended to indicate that many different types of antennas may be used among the antenna elements $A_{b1}$ through $A_{bn}$, $A_{c1}$ through $A_{cn}$, and $A_{d1}$ through $A_{dn}$.

As with the antenna assembly 100 discussed above (FIG. 1), the antenna assembly 300 is capable of achieving diversity. Specifically, the antenna assembly 300 is capable of achieving spatial diversity and/or polarization diversity in the manner described above. Furthermore, the use of antenna elements on three non-coplanar walls instead of just two non-coplanar walls advantageously increases the number of directions in which the antenna assembly 300 has good uniformity in signal strength.

Figure 6:
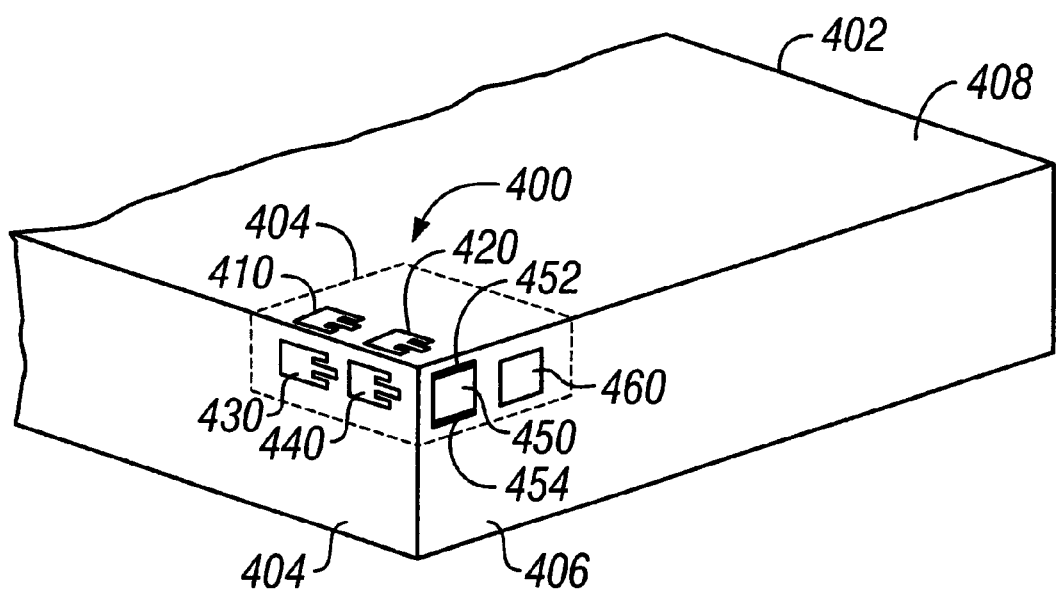
FIG. 6 is a perspective view illustrating a device housing having an antenna assembly incorporated therein in accordance with another embodiment of the present invention.

Referring to FIG. 6, there is illustrated an antenna assembly 400 made in accordance with yet another embodiment of the present invention. In this embodiment, six separate antenna elements 410, 420, 430, 440, 450, 460 are mounted near a corner of a housing 402. Two antenna elements 410, 420 are mounted on a portion of a first wall 408 of the housing 402, two antenna elements 430, 440 are mounted on a portion of a second wall 404 of the housing 402, and two antenna elements 450, 460 are mounted on a portion of a third wall 406 of the housing 402. While this embodiment includes six antenna elements, the present invention is not limited to the use of six antenna elements. Furthermore, as with the housing 102 discussed above (FIG. 1), the housing 402 may be part of many different types of devices.

In this embodiment, all six of the antenna elements 410, 420, 430, 440, 450, 460 are implemented with patch antennas. In order to illustrates that many different types of antennas may be used, it is noted that the illustrated patch antenna elements 450, 460 have a feed point from a ground plane layer beneath the patch and that the patch antenna elements 410, 420, 430, 440 have an inset feed. As mentioned above, however, it should be well understood that many different types of antennas may be used in accordance with the present invention.

A ground plane 404 is positioned on the inside of the housing 402 behind the antenna elements 410, 420, 430, 440, 450, 460. By way of example, the ground plane 404 may comprise copper plating. Similar to as described above, each of the antenna elements 410, 420, 430, 440, 450, 460 is preferably individually designed to have good gain and VSWR while also delivering good inter-element isolation, which helps to achieve good diversity gain. This configuration is also very convenient for application in the 5 to 6 GHz frequency band where low-cost and antenna diversity is desired.

The antenna elements 410, 420, 430, 440, 450, 460 are capable of achieving spatial and/or polarization diversity as described above. This helps to deliver good receive and transmit diversity performance. Spatial diversity can be achieved by appropriately spacing two or more of the individual antenna elements 410, 420, 430, 440, 450, 460 so as to obtain sufficient decorrelation. Polarization diversity can be achieved by making the polarizations of at least two of the antenna elements 410, 420, 430, 440, 450, 460 orthogonal to each other. For example, assuming that the two walls 404, 408 form a right angle (90°), the polarizations of the antenna elements 410, 420 would be orthogonal to the polarizations of the antenna elements 430, 440. By way of further example, the active (radiating) edges 452, 454 of the patch antenna 450 could be purposely chosen to be orthogonal to the polarization present on the edges of the antenna element 460. Such orthogonality helps to achieve polarization diversity.

Figure 7:
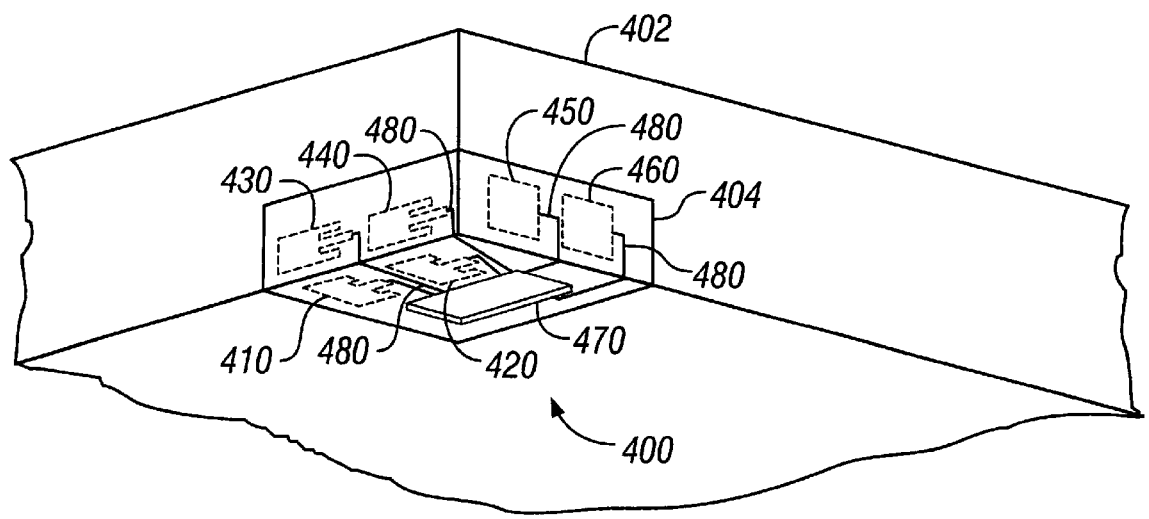
FIG. 7 is a perspective view illustrating the backside of the antenna assembly shown in FIG. 6.

Referring to FIG. 7, some or all of the active circuitry 470, such as RF circuitry, can be conveniently located within the housing 402 on the underside of the antenna assembly 400. As discussed above, the active circuitry 470 may comprise circuitry to perform many signal processing related functions. Locating the active circuitry 470 on the backside of the antenna assembly 400 allows the active circuitry 470 to interface directly with the antenna elements 410, 420, 430, 440, 450, 460, which simplifies signal routing, eliminates the need for coaxial antenna connections, and minimizes signal loss due to the close proximity of the active circuitry 470 with the antenna elements. The active circuitry 470 may be attached to the backside of either one, two or all three of the walls 404, 406, 408. Furthermore, the active circuitry 470 may comprise separate or discrete components, or the active circuitry 470 may be integrated with all of the components of the antenna assembly 400.

Traces 480 may be used to directly interface the antenna elements 410, 420, 430, 440, 450, 460 with the active circuitry 470. The traces 480 may be implemented using many different techniques, including the coplanar feed structure and microstrip feed structure described above (FIGS. 4A and 4B).

Figure 8:
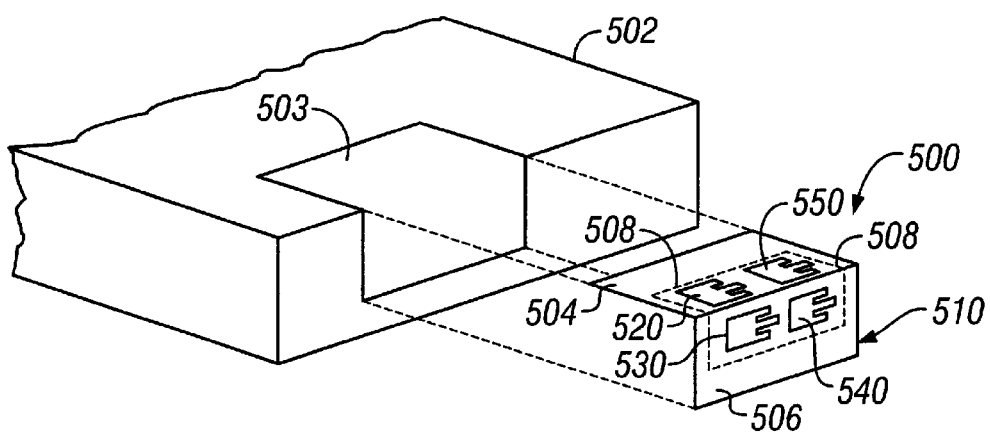
FIG. 8 is a perspective view illustrating an antenna assembly in accordance with another embodiment of the present invention.

Referring to FIG. 8, there is illustrated an antenna assembly 500 made in accordance with yet another embodiment of the present invention. The antenna assembly 500 comprises a self contained unit that can be joined with, or removed from, device housings. For example, the antenna assembly 500 can be easily added-on to a housing 502 by fitting the antenna assembly 500 into an opening 503 in the housing 502. This "add-on" capability advantageously allows the antenna assembly 500 to be provided as a working wireless unit that can be added to an assembly-ready product, such as for example, a set-top box, computer, or other device. In this scenario, for example, one manufacturer could provide the antenna assembly 500 to another manufacturer that would simply "drop" it into their assembly-ready product. Because the antenna assembly 500 can in some embodiments conform to the surface of the housing 502, it may be referred to as a removable or add-on appliqué antenna assembly.

The antenna assembly 500 includes a conformal base 510 having a shape generally corresponding to a portion of the housing 502 to which the antenna assembly 500 is to be mounted. In this embodiment, the base 510 comprises a shape corresponding to the opening 503 in the housing 502. Four antenna elements 520, 530, 540, 550 are mounted on the base 510, and all four antenna elements 520, 530, 540, 550 are implemented with patch antennas. The base 510 includes two non-coplanar surfaces or plates 504, 506. Two antenna elements 520, 550 are mounted on the first plate 504, and two antenna elements 530, 540 are mounted on the second plate 506. The antenna elements are preferably located on the outer surfaces (or front sides) of the plates 504, 506. It should be well understood that the number of antenna elements is not limited to four and that other types of antennas may be used in accordance with the present invention.

Figure 5:
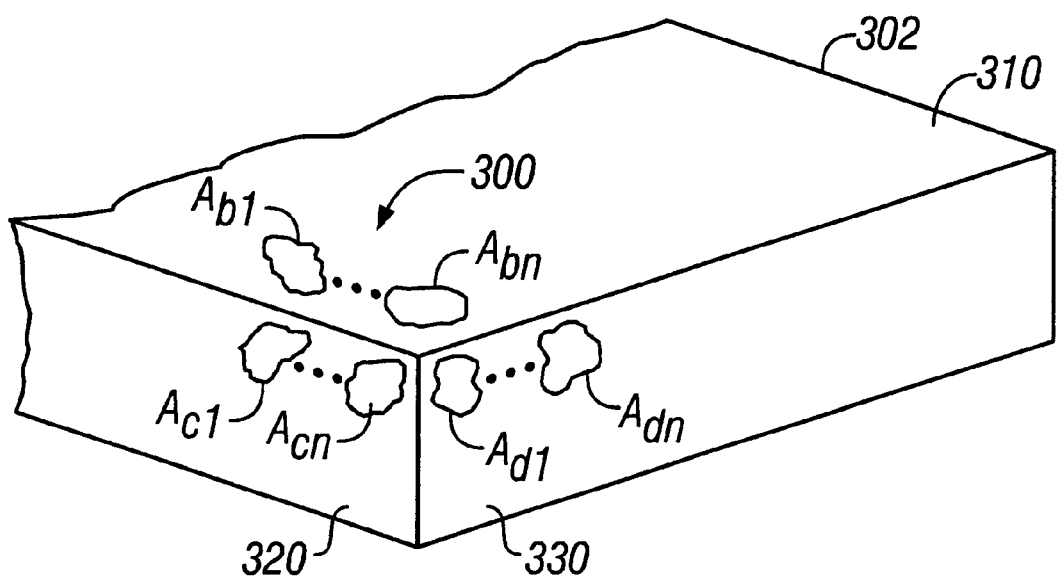
FIG. 5 is a perspective view illustrating a device housing having an antenna assembly incorporated therein in accordance with another embodiment of the present invention.

Although in this embodiment the base 510 is shown as having two non-coplanar plates 504, 506 that conform to the shape of the edge of the housing 502, other embodiments of the present invention may include a base having three non-coplanar surfaces or plates so as to conform with a corner of a device housing. In such a corner application, the antenna elements could be distributed over the conformal base in a manner similar to the distribution of antenna elements in the antenna assemblies 300, 400 (FIGS. 5, 6). As mentioned above, an edge of a housing may include a rounded, flat or otherwise irregular part of the housing where noncoplanar surfaces meet.

The first and second plates 504, 506 of the base 510 include metal patterns that define the structure of the antenna elements 520, 530, 540, 550. A ground plane 508 is positioned on the other side of the base 510 behind the antenna elements 520, 530, 540, 550. By way of example, the base 510 can be made of metalized plastic with the metalized surface being used to provide the ground plane 508. It should be well understood, however, that the base 510 may be made from many different types of materials. Similar to as described above, each of the antenna elements 520, 530, 540, 550 is preferably individually designed to have good gain and VSWR while also delivering good inter-element isolation, which helps to achieve good diversity gain.

As described above, spatial diversity can be achieved by appropriately spacing two or more of the individual antenna elements 520, 530, 540, 550 so as to obtain sufficient decorrelation. Polarization diversity can be achieved by making the polarizations of at least two of the antenna elements 520, 530, 540, 550 orthogonal to each other. For example, in a scenario where the two plates 504, 506 form a right angle (90°), the polarizations of the antenna elements 520, 550 would be orthogonal to the polarizations of the antenna elements 530, 540.

Figure 9:
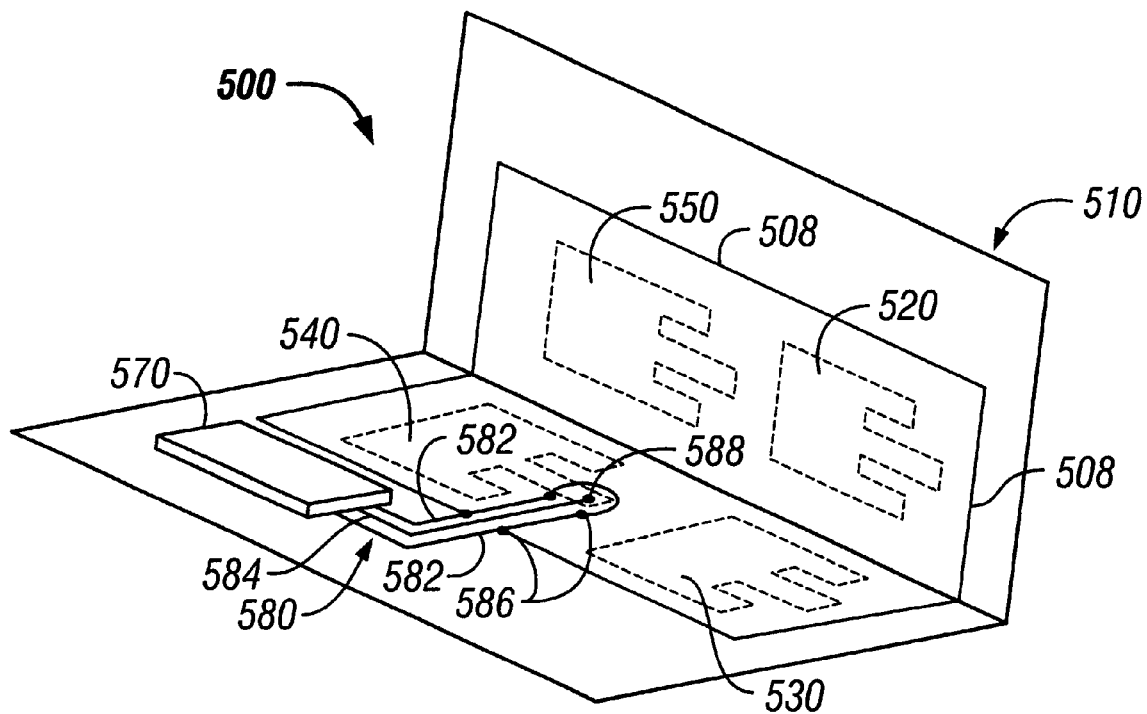
FIG. 9 is a perspective view illustrating the backside of the antenna assembly shown in FIG. 8.

Referring to FIG. 9, some or all of the active circuitry 570, such as RF circuitry, can be conveniently located on the underside (or backside) of the base 510. As discussed above, the active circuitry 570 may comprise circuitry to perform many signal processing related functions. For example, the active circuitry 570 may comprise an operable transceiver, which could allow the antenna assembly 500 to be provided as a working wireless unit. Locating the active circuitry 570 on the backside of the base 510 allows the active circuitry 570 to interface directly with the antenna elements 520, 530, 540, 550, which simplifies signal routing, eliminates the need for coaxial antenna connections, and minimizes signal loss due to the close proximity of the active circuitry 570 with the antenna elements. The active circuitry 570 may comprise separate or discrete components that are attached to the base 510, or the active circuitry 570 may be integrated with all of the components of the antenna assembly 500. As illustrated, the active circuitry 570 is not mounted on the ground plane 508, but it is contemplated that in other embodiments the active circuitry 570 could be mounted on the ground plane 508. Furthermore, the active circuitry 570 could be attached to the backside of either one or both of the plates 504, 506.

Many different techniques may be used to directly interface the antenna elements 520, 530, 540, 550 with the active circuitry 570 and for routing transmit and receive signals. Such techniques include the coplanar feed structure and microstrip feed structure described above (FIGS. 4A and 4B). In the illustrated example, the antenna element 540 is directly interfaced with the active circuitry 570 using a coplanar feed structure 580. Specifically, the coplanar feed structure 580 includes ground paths 582 and a center conductor 584. The ground paths 582 may be connected to the ground plane 508 with via connections 586. The center conductor 584 may be connected to the top-side microstrip of the antenna element 540 with a via connection 588 and the appropriate coplanar-to-microstrip impedance transition. The ground paths 582 and the center conductor 584 may be routed along the backside of the surface 506 to the active circuitry 570. Similar connections may be made to the other antenna elements 520, 530, 550. It should be well understood that this is just one exemplary manner of coupling the antenna elements to the active circuitry 570 and that many other types of connections may be used in accordance with the present invention.

Figure 10:
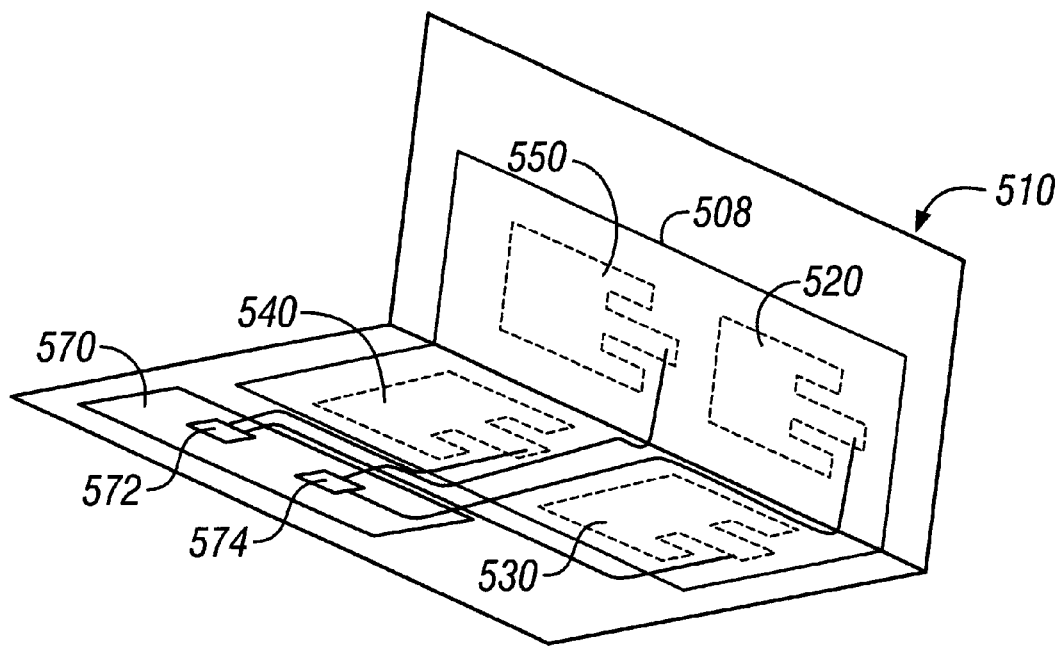
FIG. 10 is a perspective view illustrating the backside of the antenna assembly shown in FIG. 8 with additional optional features.

It was mentioned above that more than one power amplifier stage in the transmitter can be used, which reduces the maximum power level required out of any individual power amplifier stage. Making the polarizations of at least two antenna elements orthogonal to each other permits separate transmitter power amplifier stages to drive each of the two polarizations, thereby lowering the required power amplifier output power (per branch) by 3 dB. For example, referring to FIG. 10, in the scenario where the polarizations of the antenna elements 520, 550 are orthogonal to the polarizations of the antenna elements 530, 540, the active circuitry 570 could include one transmitter power amplifier stage 572 for driving the antenna elements 530, 540 and a separate transmitter power amplifier stage 574 for driving the antenna elements 520, 550. This can help reduce the required power amplifier output power while delivering the same total output power level.

Figure 11:
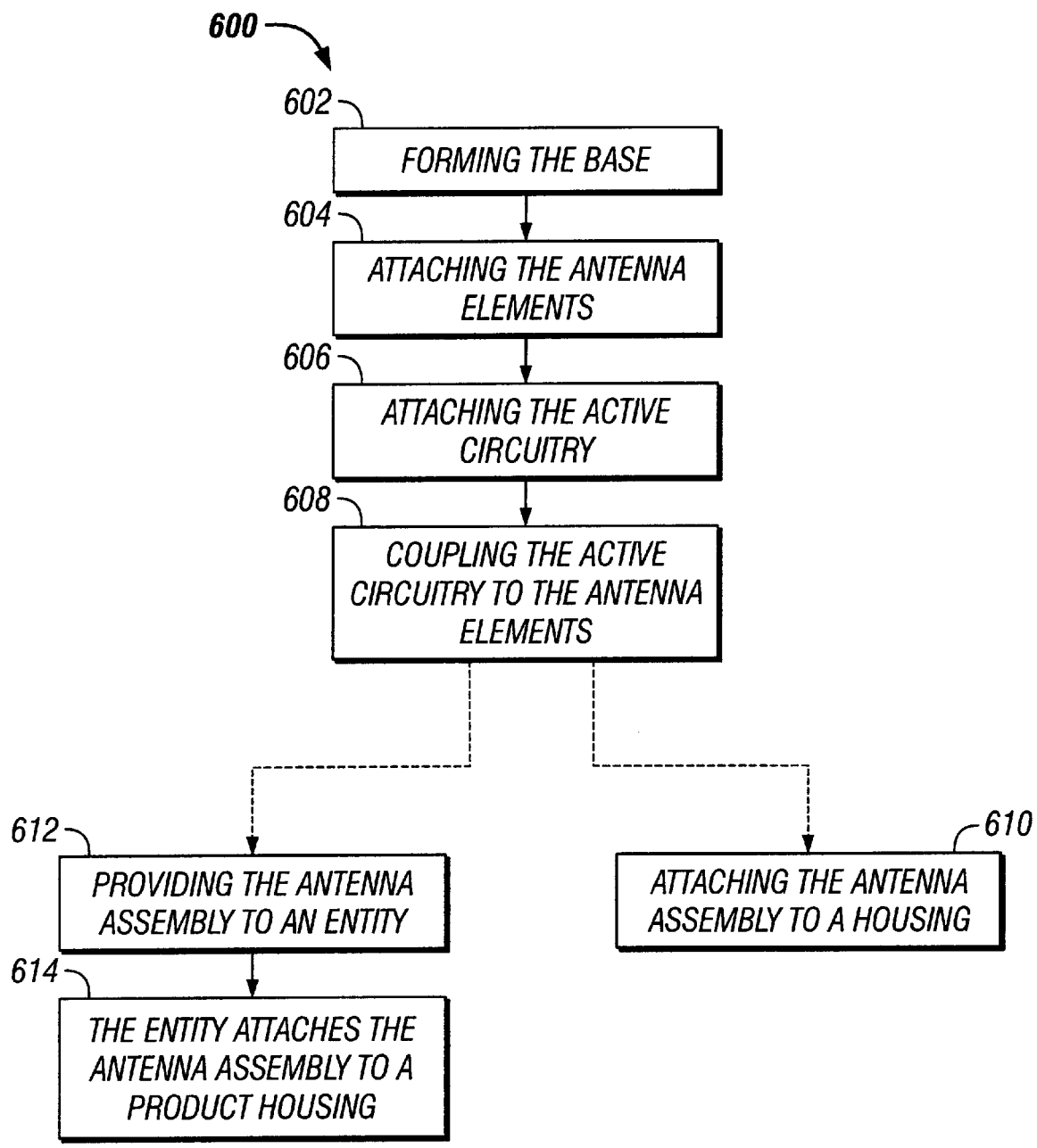
FIG. 11 is a flowchart illustrating a method of making and providing an antenna assembly in accordance with another embodiment of the present invention.

It was suggested above that because of the "add-on" capability of the antenna assembly 500, one entity could manufacture or assemble the antenna assembly 500 and provide it to another entity or manufacturer that would simply "drop" it into an assembly-ready product. FIG. 11 illustrates a method 600 in accordance with one embodiment of the present invention. Steps 602, 604, 606 and 608 comprise a method of making the antenna assembly 500 in accordance with one embodiment of the present invention. Specifically, in step 602 the base 510 is formed to have first and second plates 504, 506 that are noncoplanar. The base 510 is preferably formed so that it comprises a shape that conforms to a portion of a housing to which attachment is to eventually occur, such as the housing 502. In step 604 at least two antenna elements are attached to the base 510. A first of the at least two antenna elements, such as antenna element 520, is located on a front side of the first plate 504, and a second of the at least two antenna elements, such as antenna element 530, is located on a front side of the second plate 506. In step 606 the active circuitry 570 is attached or integrated onto a back side of at least one or both of the first and second plates 504, 506. In step 608 the active circuitry 570 is coupled to the at least two antenna elements, such as for example with a coplanar feed structure or a microstrip feed structure. It should be well understood that steps 602, 604, 606 and 608 do not have to be performed in the illustrated order and that one or more of these steps may be combined into an integration process whereby two or more steps are performed at the same time.

Either one, none, or both of steps 610 and 612 may be performed. Specifically, in step 610 the completed antenna assembly 500 is attached to a housing. In step 612 the completed antenna assembly 500 is provided to an entity that distributes a product having a housing for which the antenna assembly 500 is intended. If step 612 is performed, then in step 614 that entity attaches the antenna assembly 500 to the intended product housing.

The following United States patent applications are hereby fully incorporated into the present application by reference: U.S. patent application Ser. No. 09/693,465, filed Oct. 19, 2000, entitled DIVERSITY ANTENNA STRUCTURE FOR WIRELESS COMMUNICATIONS, by inventor James A. Crawford; and U.S. patent application Ser. No. 09/735,977, filed Dec. 13, 2000, entitled CARD-BASED DIVERSITY ANTENNA STRUCTURE FOR WIRELESS COMMUNICATIONS, by inventor James A. Crawford.

While the invention herein disclosed has been described by means of specific embodiments and applications thereof, numerous modifications and variations could be made thereto by those skilled in the art without departing from the scope of the invention set forth in the claims.

What is claimed is:

1. An antenna assembly, comprising:
    a portion of a first outer wall of a consumer electronics device housing that houses an electronic device having a need to communicate wirelessly;
    a portion of a second outer wall of the consumer electronics device housing, the first and second outer walls being noncoplanar;
    at least two antenna elements with a first of the at least two antenna elements being attached to an exterior surface of the portion of the first outer wall and a second of the at least two antenna elements being attached to an exterior surface of the portion of the second outer wall; and
    active circuitry attached to an interior surface of at least one of the portion of the first outer wall and the portion of the second outer wall, the active circuitry being coupled to the at least two antenna elements;
    wherein at least two of the at least two antenna elements are configured to achieve diversity in a local area multipath environment that is created when a signal reflects from objects in the local area multipath environment.

2. An antenna assembly in accordance with claim 1, wherein at least two of the at least two antenna elements are sufficiently spaced apart so as to achieve spatial diversity.

3. An antenna assembly in accordance with claim 1, wherein at least two of the at least two antenna elements are spaced apart by a distance equal to or greater than 0.5λ for a predetermined frequency of operation.

4. An antenna assembly in accordance with claim 3, wherein the predetermined frequency of operation falls within 5 to 6 gigahertz (GHz).

5. An antenna assembly in accordance with claim 1, wherein at least one of the at least two antenna elements comprises a first polarization and at least one of the at least two antenna elements comprises a second polarization, wherein the first and second polarizations are orthogonal to each other so as to achieve polarization diversity.

6. An antenna assembly in accordance with claim 5, wherein the active circuitry comprises:
    a first power amplifier configured to drive the first polarization; and
    a second power amplifier configured to drive the second polarization.

7. An antenna assembly in accordance with claim 1, further comprising:
    a ground plane attached to the interior surface of the portion of the first outer wall and the interior surface of the portion of the second outer wall.

8. An antenna assembly in accordance with claim 1, wherein one or more of the at least two antenna elements comprises a patch antenna.

9. An antenna assembly in accordance with claim 1, further comprising:
    a portion of a third outer wall of the consumer electronics device housing, wherein the first, second and third outer walls are noncoplanar; and
    a third of the at least two antenna elements being attached to an exterior surface of the portion of the third outer wall.

10. An antenna assembly in accordance with claim 9, wherein the portion of the first outer wall, the portion of the second outer wall and the portion of the third outer wall form a corner of the consumer electronics device housing.

11. An antenna assembly, comprising:
    a base having first and second plates that are noncoplanar and that are joined together, wherein the base comprises a shape that conforms to exterior surfaces of outer walls of a consumer electronics device housing that houses an electronic device having a need to communicate wirelessly;
    at least two antenna elements with a first of the at least two antenna elements being attached to an exterior surface of the first plate and a second of the at least two antenna elements being attached to an exterior surface of the second plate; and
    active circuitry attached to an interior surface of at least one of the first and second plates, the active circuitry being coupled to the at least two antenna elements;
    wherein at least two of the at least two antenna elements are configured to achieve diversity in a local area multipath environment that is created when a signal reflects from objects in the local area multipath environment.

12. An antenna assembly in accordance with claim 11, wherein at least two of the at least two antenna elements are sufficiently spaced apart so as to achieve spatial diversity.

13. An antenna assembly in accordance with claim 11, wherein at least two of the at least two antenna elements are spaced apart by a distance equal to or greater than 0.5λ for a predetermined frequency of operation.

14. An antenna assembly in accordance with claim 13, wherein the predetermined frequency of operation falls within 5 to 6 gigahertz (GHz).

15. An antenna assembly in accordance with claim 11, wherein at least one of the at least two antenna elements comprises a first polarization and at least one of the at least two antenna elements comprises a second polarization, wherein the first and second polarizations are orthogonal to each other so as to achieve polarization diversity.

16. An antenna assembly in accordance with claim 15, wherein the active circuitry comprises:
    a first power amplifier configured to drive the first polarization; and
    a second power amplifier configured to drive the second polarization.

17. An antenna assembly in accordance with claim 11, further comprising:
    a ground plane attached to the interior surface of the first and second plates.

18. An antenna assembly in accordance with claim 11, wherein one or more of the at least two antenna elements comprises a patch antenna.

19. A method that includes a method of making an antenna assembly, the method of making an antenna assembly comprising the steps of:
    forming a base having first and second plates that are noncoplanar and that comprises a shape that conforms to exterior surfaces of outer walls of a consumer electronics device housing that houses an electronic device having a need to communicate wirelessly;
    attaching at least two antenna elements to the base with a first of the at least two antenna elements being located on an exterior surface of the first plate and a second of the at least two antenna elements being located on an exterior surface of the second plate;
    attaching active circuitry to an interior surface of at least one of the first and second plates;
    coupling the active circuitry to the at least two antenna elements; and
    configuring at least two of the at least two antenna elements to achieve diversity in a local area multipath environment that is created when a signal reflects from objects in the local area multipath environment.

20. A method in accordance with claim 19, further comprising the step of:
    providing the antenna assembly to an entity that distributes a product having the consumer electronics device housing.

21. A method in accordance with claim 19, further comprising the step of:
    attaching the antenna assembly to the exterior surfaces of the outer walls of the consumer electronics device housing.

22. A method in accordance with claim 19, wherein the step of attaching at least two antenna elements to the base comprises the step of:
    spacing at least two of the at least two antenna elements apart so as to achieve spatial diversity.

23. A method in accordance with claim 19, wherein the step of attaching active circuitry to an interior surface of at least one of the first and second plates comprises the step of:
    integrating the active circuitry to an interior surface of at least one of the first and second plates.

24. A method in accordance with claim 19, wherein the step of attaching at least two antenna elements to the base comprises the step of:
    spacing at least two of the at least two antenna elements apart by a distance equal to or greater than $0.5\lambda$ for a predetermined frequency of operation.

25. A method in accordance with claim 24, wherein the predetermined frequency of operation falls within 5 to 6 gigahertz (GHz).

26. A method in accordance with claim 19, wherein the step of attaching at least two antenna elements to the base comprises the steps of:
    providing at least one of the at least two antenna elements with a first polarization; and
    providing at least another of the at least two antenna elements with a second polarization;
    wherein the first and second polarizations are orthogonal to each other so as to achieve polarization diversity.

27. A method in accordance with claim 26, wherein the active circuitry comprises:
    a first power amplifier configured to drive the first polarization; and
    a second power amplifier configured to drive the second polarization.

28. A method in accordance with claim 19, wherein the method of making an antenna assembly further comprises the step of:
    forming a ground plane on the interior surfaces of the first and second plates.

29. A method in accordance with claim 19, wherein one or more of the at least two antenna elements comprises a patch antenna.

* * * * *